United States Patent [19]

Mader

[11] 3,738,848

[45] June 12, 1973

[54] PROCESS FOR PRODUCING A DRIED SPLIT PEA OR DRIED LENTIL PRODUCT

[76] Inventor: Fred Mader, Route 1, Palouse, Wash. 99161

[22] Filed: Aug. 18, 1971

[21] Appl. No.: 172,887

Related U.S. Application Data

[63] Continuation-in-part of Ser. No. 781,971, Dec. 6, 1968, abandoned.

[52] U.S. Cl. .......................... 99/204, 99/1, 99/100, 99/104
[51] Int. Cl. .............................................. A23b 7/02
[58] Field of Search .................... 99/100, 103, 104, 99/204, 98, 1

[56] References Cited
UNITED STATES PATENTS

| | | | |
|---|---|---|---|
| 1,615,822 | 2/1927 | Baile | 99/98 |
| 1,813,268 | 7/1931 | Bachler | 99/98 |
| 1,859,279 | 5/1932 | Chamberlain | 99/98 |
| 1,774,110 | 8/1930 | Sloat | 99/98 |
| 2,019,141 | 10/1935 | Knowles | 99/98 |
| 2,135,592 | 11/1938 | Moulton | 99/98 |
| 2,657,999 | 11/1953 | Rauch | 99/204 |
| 3,203,808 | 8/1965 | Thompson | 99/204 |

OTHER PUBLICATIONS

Kelley, E. G. and Baum R.; Food Technology 8/55 pp. 388–92, "Preparation of Tasty Vegetable Products by Deep Fat Frying".

Primary Examiner—Wilbur L. Bascomb, Jr.
Assistant Examiner—Martin G. Mullen
Attorney—Creek Wells, Richard J. St. John and David P. Roberts

[57] ABSTRACT

A crisp nutrient food product is obtained from dried split peas or lentils by soaking the split peas or lentils in water without cooking to soften and evenly partially expand the cellular structure with little or no carbohydrate loss and cooking of the split peas or lentils in a cooking oil at a high temperature of between 375° F. and 425° F. for a brief period of time less than three minutes to fully expand, thermally set and cook the split peas or lentils. As a final step, seasoning can be applied to the cooked product.

3 Claims, No Drawings

3,738,848

PROCESS FOR PRODUCING A DRIED SPLIT PEA OR DRIED LENTIL PRODUCT

RELATED APPLICATION

This is a continuation-in-part application of application of the same title, filed Dec. 6, 1968, having Ser. No. 781,971 now abandoned.

BACKGROUND OF THE INVENTION

The primary use of split peas and lentils today in the human diet is in the production of soup. The present disclosure arose from an effort to broaden the acceptibility of split peas and lentils in the human diet, either as a basic nutrient food or as a specially seasoned snack item. Where accepted, the product will make available the nutritional values of split peas and lentils in a wide variety of diet conditions. This will be particularly advantageous where the human requirements of protein are not met by present diet supplies.

Because of the current trend toward convenience foods and simple cooking techniques, particularly in the more affluent nations, the per capita consumption of split peas and lentils in countries such as the United States has been decreasing over a period of several years. This disclosure attempts to open new markets for these basic farm commodities. It widens the applicability of split peas and lentils far beyond their usual consumption in soup.

Prior developments have involved attempts at producing food products from certain legumes particularly beans such as soya beans, utilizng a basic soaking and subsequent oil cooking process. U. S. Pat. No. 1,615,822 to Baile discusses production of a paste from soya beans or the like. It involves soaking of the beans, removal of the wet skins, and cooking in oil for a substantial period of time until the beans are thoroughly impregnated with oil and have a brown color and are brittle. The beans are then pulverized and oil is added to provide viscosity.

U. S. Pat. No. 2,019,141 to Knowles describes a slightly different process from that described in the Baile patent for preparing beans. In Knowles the beans are first soaked in water preferably for a period of approximately eighteen hours. The beans are then cooked in oil at a relatively low temperature of between 212° F. and 325° F. for a substantial period of time to reduce the moisture content to between 15 and 22 percent and form a shrivelled, hard and tough cooked bean. The beans contain approximately 10% by weight of the oil.

U. S. Pat. No. 2,083,853 to McComb describes the treatment of beans involving a limited soaking process with a subsequent sequenced cooking operation to explode the partially expanded cellular structure at a temperature of approximately 375° F. and then heating for an extended period of time at approximately 275° F. to contract the cellular structure.

U. S. Pat. No. 2,584,150 to Morris discloses the processing of dry beans by first soaking the beans in water, then partially cooking the beans in heated water, then frying the beans in oil and subsequently roasting the beans in an oven. The roasting step is required because the beans are soft and soggy after being fried in oil.

The patent disclosures discussed above relate to processes directed to beans. Although beans and split peas are legumes, i.e.—plants that place nitrogen back into the soil, they are quite structurally and chemically different. Their cellular structures are quite different and react differently to moisture. Chemically, the beans contain considerably greater amounts of saponins. Beans contain a lipoxidase enzyme not found in split peas which must be de-activated to prevent their deterioration in storage. This problem is described in the Dorsey et. al. U. S. Pat. No. 3,290,159 granted Dec. 6, 1966. Furthermore, the beans contain an anti-trypsin enzyme not found in split peas which can cause digestive problems if the beans are not cooked for between 20–30 minutes at temperatures of 230° F. or above. If the above-mentioned prior art processes were utilized for split peas or lentils, one would obtain a burned, heavily scorched mass of cooked product unfit for human consumption.

Dry peas and lentils do not involve hard shells or skins that must be removed in their utilization. They are very hard foods in their dry state and are not used as individual food particles. When used in soup, the split pea or lentil is at least partially disintegrated to provide a solution that is rather mushy. In contrast, the food product produced by the process discussed herein is crisp and easily chewable. This process maintains the individual integrity of the split pea or lentil. The end product is most appetizing and answers the need of the human diet for protein values. The product has a very long shelf life.

It is a first object of this invention to provide a practical process for producing a crisp chewable food substance from dry split peas or lentils.

Another object of the invention is provide a relatively simple process for producing the product. The process can be carried out in a small batch method or can be continuously adapted to modern production techniques. The processing of the product does not substantially add to the basic cost of the raw material.

A primary object of the invention is to provide a novel food product which will serve to increase the consumption of split peas and lentils in the human diet. The product will thereby add to the protein content of the human diet and make use of available food materials for upgrading diets which are now low in protein.

BRIEF DESCRIPTION OF THE PREFERRED EMBODIMENT

The product disclosed is produced from dried split peas or dried lentils. The product can be produced from any one or a combination of the varieties available. The individual dry split pea or lentil is initially about 1/4th inch across. The fiber structure is very hard and brittle and is not easily disintegrated. Consequently a dried split pea or lentil cannot be comfortably chewed. A dried split pea or lentil contains some saponins (glucosides) which provide a pronounced bitterness and a characteristic "raw taste". From this I have produced a nutrient food product that is easily chewed, having a crispness which greatly enhances its attractiveness as a food.

This process can be carried out in a batch sequence at any desired scale or in a continuous process. The choice involved is dependent upon available machinery and the demand for the product produced. The dry split peas or lentils are first preconditioned by soaking in water without cooking. The soaking of the split peas or lentils is continued for a period adequate to soften and evenly partially expand the cellular structure by swelling and elastically pre-conditioning the fibers of the individual pea or lentil. The soaking is continued until the split peas or lentils are completely penetrated to saturation; but not over-soaked, causing loss of more than 1 percent of the carbohydrates. At saturation the split peas contain about 41 percent water by weight. Soaking also softens and chnages the saponins (glucosides) into a water soluable state. The soaking pre-conditions the fibrous and cellular structure so that the split pea or lentil will be able to undergo further expansion and to subsequently release the moisture under given conditions and to be able to be subsequently hardened or set by heat once full or total expansion has been achieved to absorb a minimum amount of cooking oil.

The soaking water used may be unheated tap water allowed to naturally approach normal room temperature (approximately 70° F.). The soaking period can be shortened somewhat by raising the water temperature, the limit of water temperature being that at which the pea or lentil will disintegrate or lose its individual integrity which is generally considered to be about 180° F.

When using split peas, I have found that soaking in tap water for a period of twelve to fourteen hours without any heating other than normal warming to room temperature accomplishes the desired result of producing a softened, saturated and partially expanded split pea. When using lentils, I have found that similar soaking for a period of seven to eight hours is adequate.

The pre-conditioned split peas or lentils are then drained and rinsed in fresh cold water. Excess water is removed by blotting or by passage through a curtain of air. It is not necessary or advisable to completely dry the surfaces. The surface moisture remaining on the individual split pea or lentil should be such that they retain a damp appearance.

The split peas or lentils are now prepared for the important cooking step. While still saturated, the split peas or lentils are submerged in a cooking oil at temperatures between 375° to 425° F. for a period of less than three (3) minutes to rapidly expel the moisture and fully expand the cellular structure and rapidly theremally set and cook the cellular structure in the fully expanded condition to form a crisp product having less than 3 percent moisture and 8 percent cooking oil by weight.

At a temperature of 400° F., the split peas cook in approximately two minutes and the lentils cook in approximately one and one quarter minutes.

When the saturated or pre-conditioned split peas or lentils are submerged in the cooking oil at a temperature between 375° F. and 425° F., the heat from the oil causes the moisture within the cellular structure of the individual split pea or lentil to rapidly form steam. In response thereto the flexible pre-conditioned cellular structure rapidly expands as the steam pressure increases. The steam pressure increases until the elasticity of the fibers is overcome to release the steam from the cellular structure. At the fully expanded condition the steam is rapidly released without the structure exploding. As the moisture in the form of steam, is rapidly expelled with great force, the steam unites with or links onto the saponins to remove the saponins from the split peas or lentils freeing the split peas or lentils of the bitter or characteristic "raw taste" leaving the split peas or lentils with a pleasant, mild and unique taste.

As soon as the moisture is expelled from the fully expanded split pea or lentil, the heat thermally hardens or sets and cooks the fully expanded cellular structure rendering the expanded split pea or lentil rather brittle giving it a crisp or crunchy characteristic when eaten. The rapid expulsion of the steam from the expanded cellular structure leaves small minute empty cellular pockets throughout the interior of the split pea or lentil.

Preferably, the moisutre is reduced to between 1 and 2 percent by weight in the cooked product. The cooked product preferably has approximately 7 percent oil content by weight. The product, although somewhat brittle, has sufficient structural body to prevent undue breakage or granulation during normal handling and packaging. The product cannot be considered as being hard or difficult to chew as compared with the starting material.

For cooking purposes, a vegetable oil is preferable. One choice that is very acceptable is soy bean oil of a conventional quality containing proper additives to preserve freshness in the cooked product.

Any oil plus suitable additives may be used if it is capable of withstanding the high cooking temperatures involved in this process. The choice of a particular oil will vary the flavor imparted to the cooked product. The food product produced by this process is capable of retaining its freshness for several weeks at room temperature in an exposed condition. For prolonged shelf-life, vacuum packaging or available preservation techniques can be used.

After cooking has been completed, the peas or lentils are drained to remove excess surface oil. They can be dried either by blotting or passage through an air stream. The product can then be seasoned with salt, pepper, garlic or celery salt, lemon or any other suitable seasoniing product. A dry seasoning can be used, which will adhere to the surface of the individual pea or lentil due to the slight oil retained thereon.

The final product is an appetizing nutrient food that can be readily consumed by humans. It is highly satisfactory as a basic nutrient that is readily adaptable to many national diets. It also is highly satisfactory as a snack item to be used as a substitue or replacement for salted nuts, potato chips or the like.

It should be pointed out that should dried beans be processed in accordance with this process, the resulting bean product would have a lingering "raw taste" which is quite objectionable and totally commercially unacceptable.

Having thus described my invention, I claim:

1. A process for producing a nutrient food product from dried split peas or dried lentils, comprising the steps of:
 pre-conditioning the dried split peas or dried lentils by soaking the dried split peas or dried lentils in water without cooking for a period of time sufficient to enable the water to fully penetrate the dried split peas or dried lentils evenly until the split peas or lentils contain approximately 41 percent water by weight and to soften and partially expand their cellular structure;
 submerging the pre-conditioned split peas or lentils for a positive time less than 3 minutes in a cooking oil at a temperature between 375° F. and 425° F. to (1) fully expand the split peas or lentils, (2) expel most of the moisture, (3) thermally harden the split peas or lentils, and (4) cook the split peas or lentils to form a crisp nutrient food product having a moisture content of less than 3 percent by weight and a cooking oil content of less than 8 percent by weight.

2. The process as defined in claim 1 wherein the evenly expanded dried peas or dried lentils are submerged in the cooking oil between 1 and 2 ½ minutes at temperatures between 375° F. and 425° F.

3. The process as defined in claim 1 further comprising the step of applying a seasoning material to the surface of the cooked split peas or lentils.

* * * * *